(12) United States Patent
Palmer

(10) Patent No.: US 6,780,217 B1
(45) Date of Patent: Aug. 24, 2004

(54) PANEL AIR FILTER WITH GASKET OF NON-WOVEN FELT

(75) Inventor: David L. Palmer, Gastonia, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/207,908

(22) Filed: Jul. 31, 2002

(51) Int. Cl.$^7$ ................................................ B01D 46/10
(52) U.S. Cl. .................... 55/502; 55/385.3; 55/481; 55/497; 55/503; 55/511; 55/521; 55/528
(58) Field of Search ................... 55/385.3, 478, 55/481, 497, 500, 502, 503, 504, 521, 527, 528, DIG. 31, 511

(56) References Cited

U.S. PATENT DOCUMENTS

| | | |
|---|---|---|
| 3,747,772 A | 7/1973 | Brown |
| 3,884,662 A | 5/1975 | Hladik |
| 4,031,283 A | 6/1977 | Fagan |
| 4,098,942 A | 7/1978 | Tart et al. |
| 4,612,237 A | 9/1986 | Frankenburg |
| 5,409,606 A | 4/1995 | Spencer |
| 5,676,778 A | 10/1997 | Marble |
| 5,679,122 A | 10/1997 | Moll et al. |
| 5,688,301 A | 11/1997 | Brandon et al. |
| 5,885,390 A | 3/1999 | Alkire et al. |
| 5,980,680 A | 11/1999 | Miller |
| 6,077,795 A | 6/2000 | Blinkhorn et al. |
| 6,174,343 B1 | 1/2001 | Bloomer |
| 6,315,805 B1 | 11/2001 | Strauss |
| 6,375,699 B1 | 4/2002 | Beck |

*Primary Examiner*—Duane Smith
*Assistant Examiner*—Jason M. Greene
(74) *Attorney, Agent, or Firm*—Millen, White, Zelano & Branigan, P.C.

(57) ABSTRACT

A panel filter element having pleated filter paper media and precut gasket made of polyester felt is mounted in a tray inserted into the air intake housing of an internal combustion engine, wherein the air intake housing is made of NYLON® material. By having a peripheral gasket made of polyester felt, the gasket does not adhere to portions of the housing and tray. This allows the panel filter element to be easily removed from the housing. This is an improvement over polyurethane gaskets which adhere to the NYLON® of the housing when NYLON® and polyurethane are exposed to engine heat.

21 Claims, 8 Drawing Sheets

PANEL AIR FILTER WITH GASKET OF NON-WOVEN FELT

FIELD OF THE INVENTION

The present invention is directed to a panel air filter with a gasket of non-woven felt. More particularly, the present invention is directed to a panel air filter for filtering combustion air of an internal combustion engine, wherein the panel air filter has a gasket of non-woven felt and interfaces with a plastic housing without bonding thereto.

BACKGROUND OF THE INVENTION

When mounting panel air filter elements in NYLON® filter housings in high temperature application peripheral polyurethane gaskets tend to bond to the NYLON® housings making it very difficult to dislodge used filter elements for replacement by fresh filter elements. On occasion, it is necessary to tear a polyurethane gasket in order to remove the filter element. If a portion of the gasket has adhered to components of the NYLON® housing, then it is also necessary to cut or scrape polyurethane from the housing so that the fresh filter fits correctly. The problem is especially acute with respect to filter housings in which filter elements are mounted in trays which are slid into the intake air housings. If the air filter elements become bonded to the housings, it may be necessary to destroy the housings in order to extract used air filters therefrom since bonding prevents sliding the trays out to remove used filters.

There is a need for an arrangement that provides filter elements which have gaskets that do not bond with NYLON® housings. It is of course preferable not to substantially change the configuration of existing filter housings when solving this difficulty.

SUMMARY OF THE INVENTION

In view of the aforementioned considerations, the present invention is directed to an air filter element for mounting in an air filter housing to deliver clean combustion air to an internal combustion engine wherein the air filter housing is made of plastic material. The air filter element is comprised of a panel of pleated filter media having a first face and a second face, the second face having a filtering area for receiving dirty air. The second face has a clean air exit portion and a peripheral support area. A peripheral seal made of a felt material, not directly bondable with the plastic material of the housing, is disposed on the peripheral support area of the second face of the pleated filter media.

In accordance with further aspects of the invention, the felt material is made of polyester fiber and the air filter housing is made of thermoplastic polyamide (NYLON®).

In still a further aspect of the invention, the felt material is about ½inch thick and is adhered to the peripheral support area of the first base by hot melt, polyamide adhesive.

In each aspect of the invention, the preferred pleated filter media is a paper filter media which has spacers formed therein by embossments in the media.

BRIEF DESCRIPTION OF THE DRAWINGS

From the foregoing description, one skilled in the art can easily ascertain the essential characteristics of this invention, and without departing form the spirit and scope thereof, can make various changes and modifications of the invention to adapt it to various usages and conditions.

DETAILED DESCRIPTION

Figure 1:
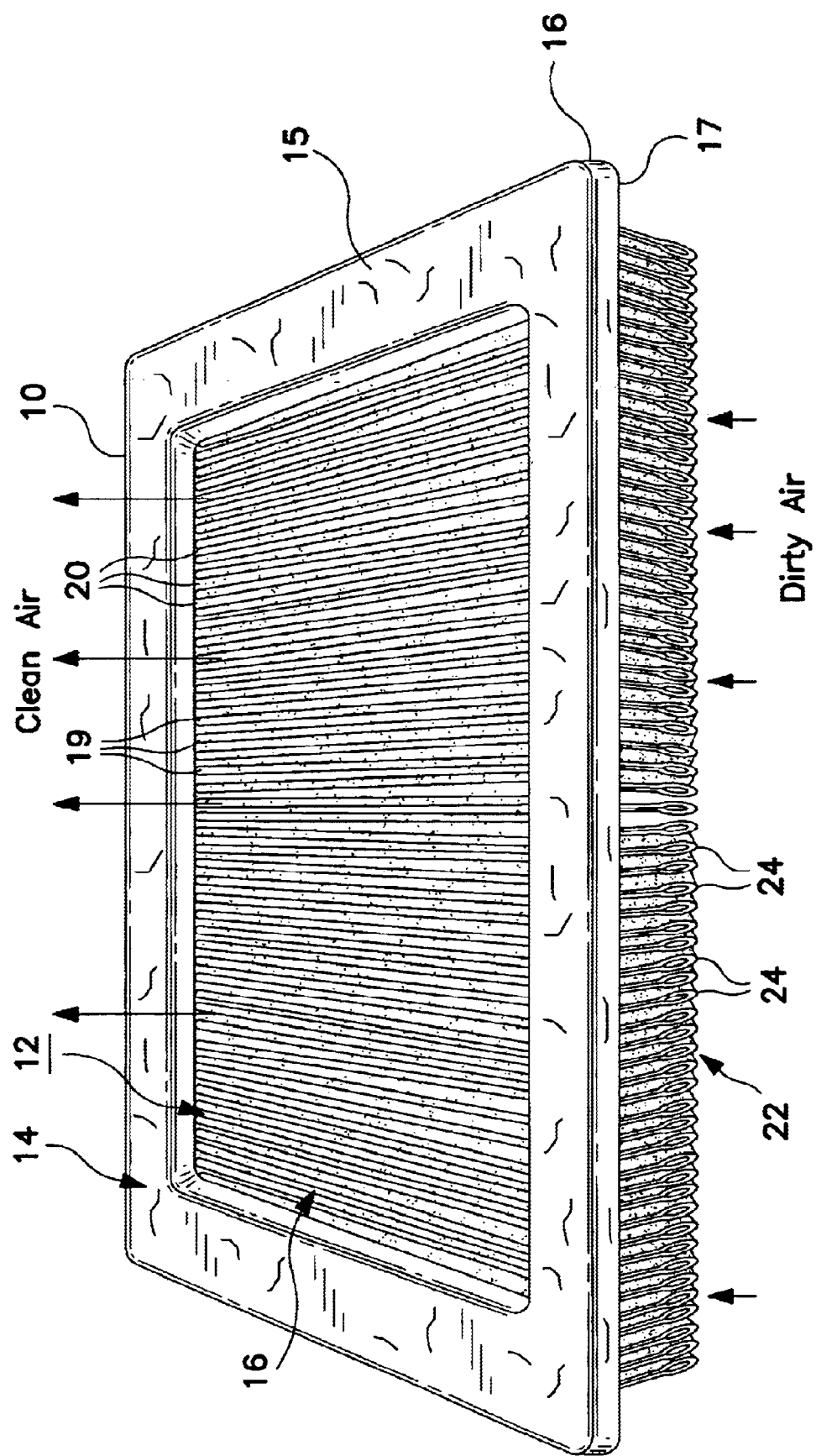
FIG. 1 is a perspective view of a panel filter element configured in accordance with the principles of the present invention.

Referring now to FIG. 1 there is shown a perspective view of the clean face of a panel filter element 10 configured in accordance with the principles of the present invention which is used with an air intake filter housing made of NYLON®.

The filter element 10 includes pleated paper filter media 12 and a precut peripheral seal 14 made of polyester fibers formed into a non-woven felt mat having a first sealing surface 15, an edge sealing surface 16 and a second sealing surface 17.

The fitter element 10 is mounted in the air intake housing of FIGS. 5–8 with the clean side facing up and the dirty side facing down so that the pleated filter media 12 has peaks at the bottom and valleys at the top. This is because the dirty air flows first through the bottom of the filter element over the peaks and exits as clean air through the top of the filter element 10 past and through the valleys.

Figure 2:
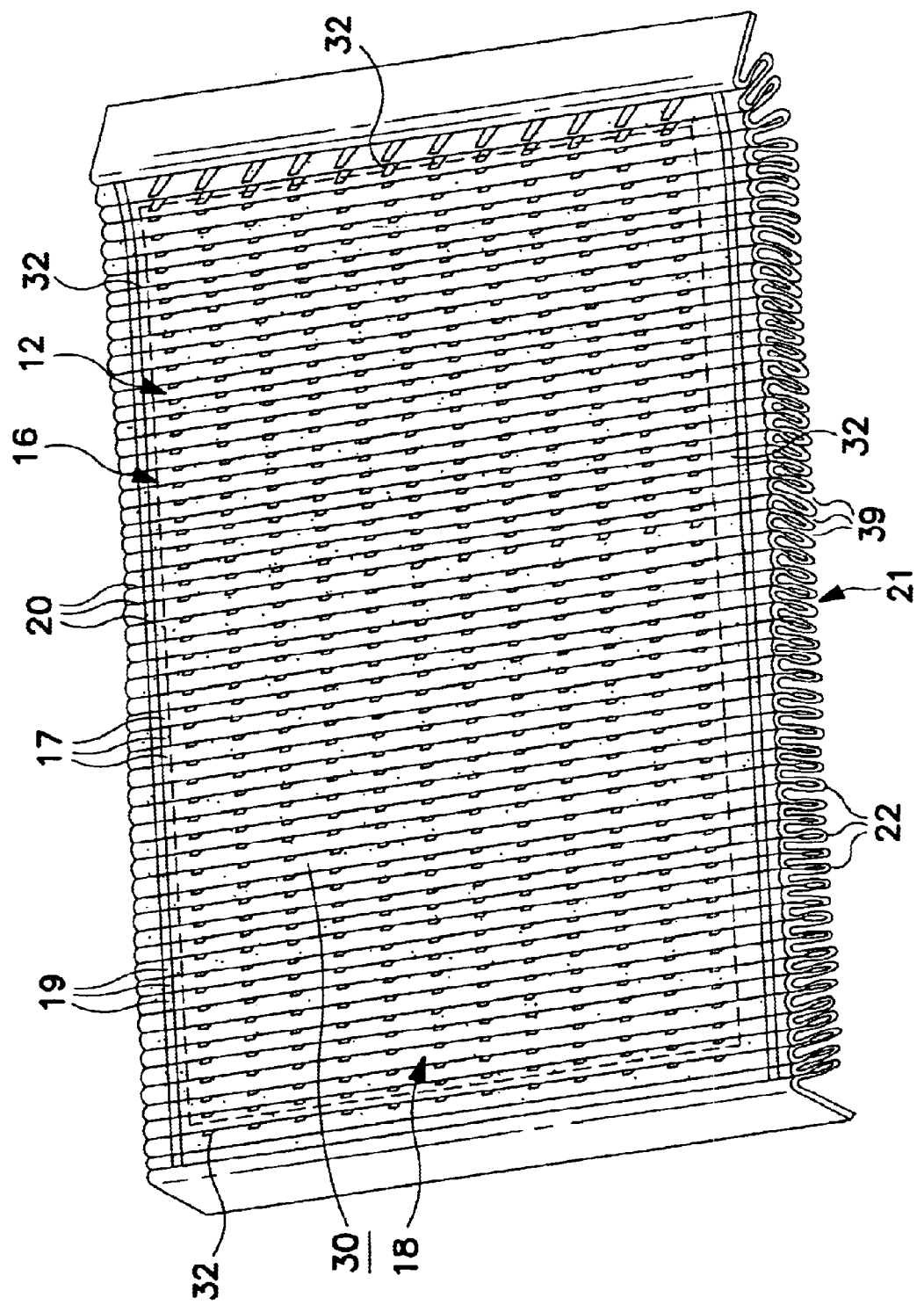
FIG. 2 is a perspective view of a filter media block used in the filter element of FIG. 1 showing the clean side of a filter media block.

Referring now to FIG. 2 where the filter media 12 is shown without the peripheral felt gasket 10, it is seen that the filter media 12 has a clean side face 18 defined by the plane which includes the valleys 19 of the filter media. Between the valleys 19 of the filter media are gaps 20 which terminate at a dirty side face 21 of the filter media in peaks 22.

The clean side face 18 of the filter media 12 is divided into a central area 30 and a peripheral area 32. The central area 30 provides the clean side face 18 of the filter media 12 with an area through which filtered air passes, while the peripheral area 32 is covered by and adheres to the precut peripheral seal 14.

Figure 3:
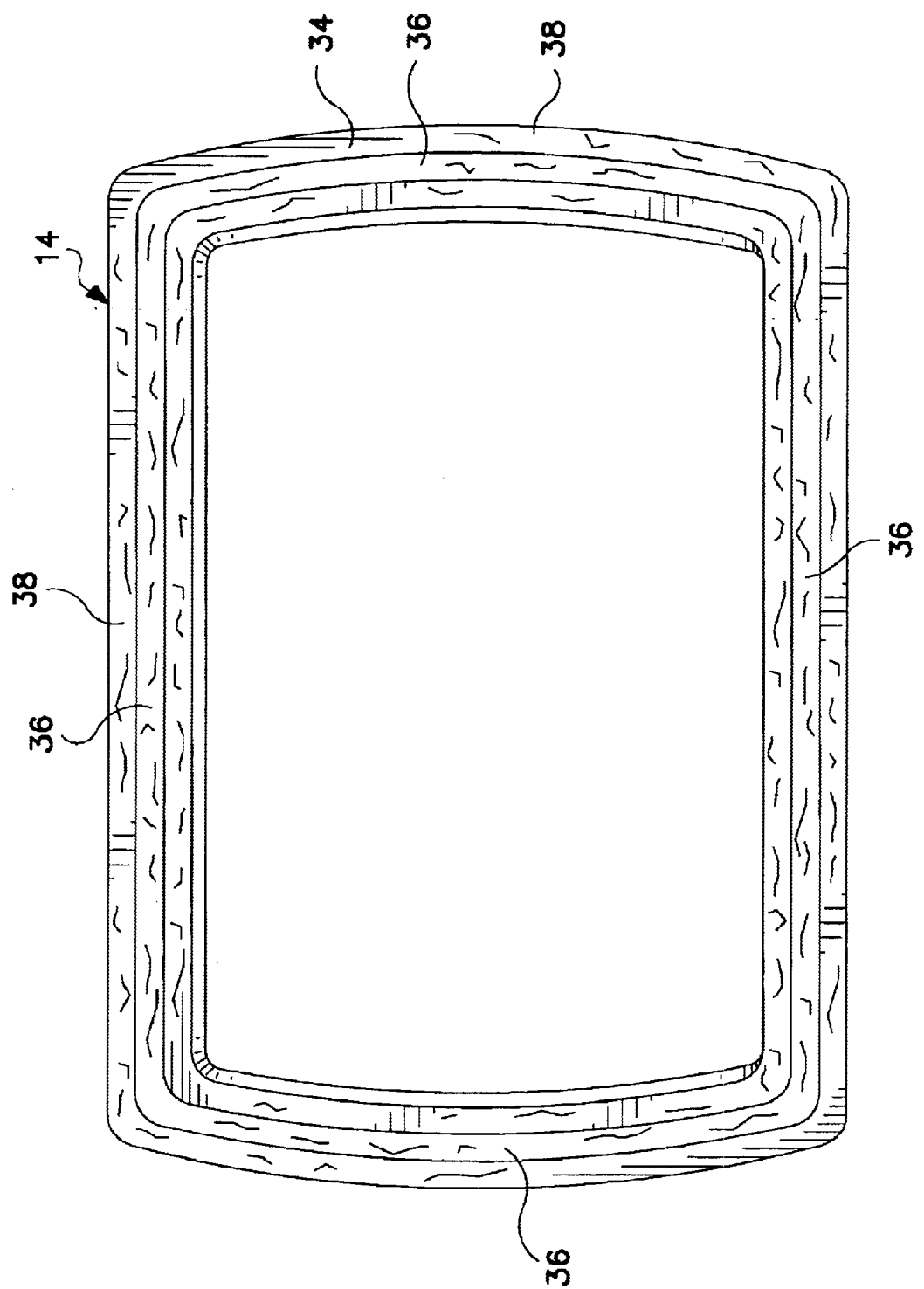
FIG. 3 is a planar view of a filter gasket with a deposit of adhesive thereon which is attached to the clean side of the filter media block of FIG. 2 to configure the filter element of FIG. 1.

Referring now to FIG. 3, it is seen that the precut peripheral seal 14, configured of polyester fibers into a felt mat, has wide bead 36 of adhesive deposited on second sealing surface 17. Preferably, the bead 36 of adhesive is a thermosetting polyamide adhesive which bonds with both the polyester fibers on second sealing surface 17 of the felt gasket 14 and with the paper 12 of the filter media in the peripheral area 32. The adhesive bead 36 provides a clean side seal which keeps the unfiltered air from passing between the filter media 12 and gasket 14. Preferably, the polyesterfelt gasket 14 extends laterally about ½inch beyond the filter media 12 to provide a sealing surface portion 38 which faces toward the dirty side face 21 of the filter element 10.

Figure 4:
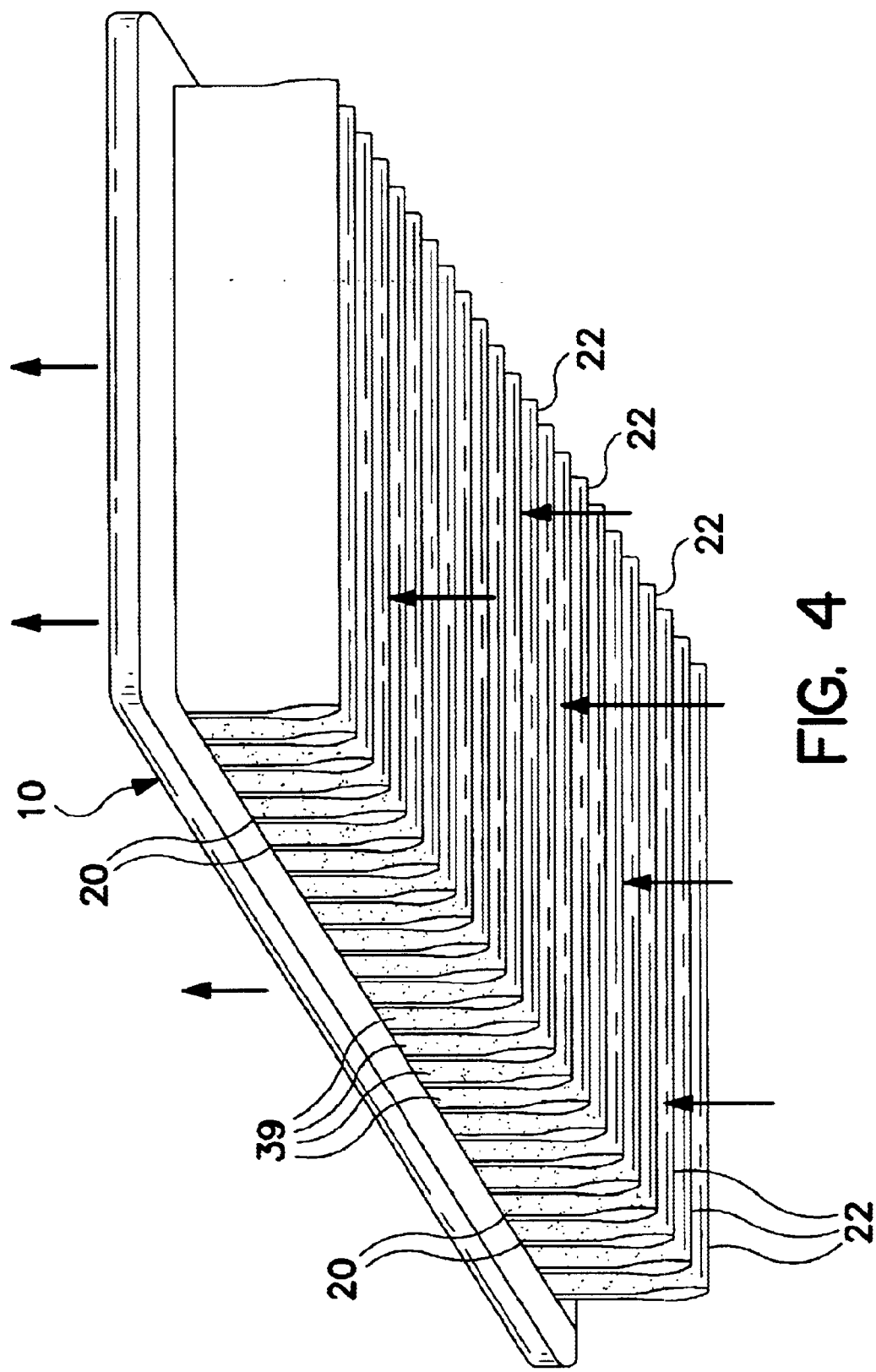
FIG. 4 is a perspective view showing the dirty side of the filter media element of FIG. 1.

Referring now to FIG. 4, it is seen that dirty air flows upward through the panel filter element 10 over the peaks 22 and into the gaps 39 between the panels of the pleated filter media 12. The dirty air then flows through the panels of the filter media 12 and exits as clean air into the gaps 20 between the valleys 19 (see FIGS. 1 and 2). The clean air then passes from the clean side face 21 of the panel filter element 10 on to the engine as combustion air.

Figure 5:
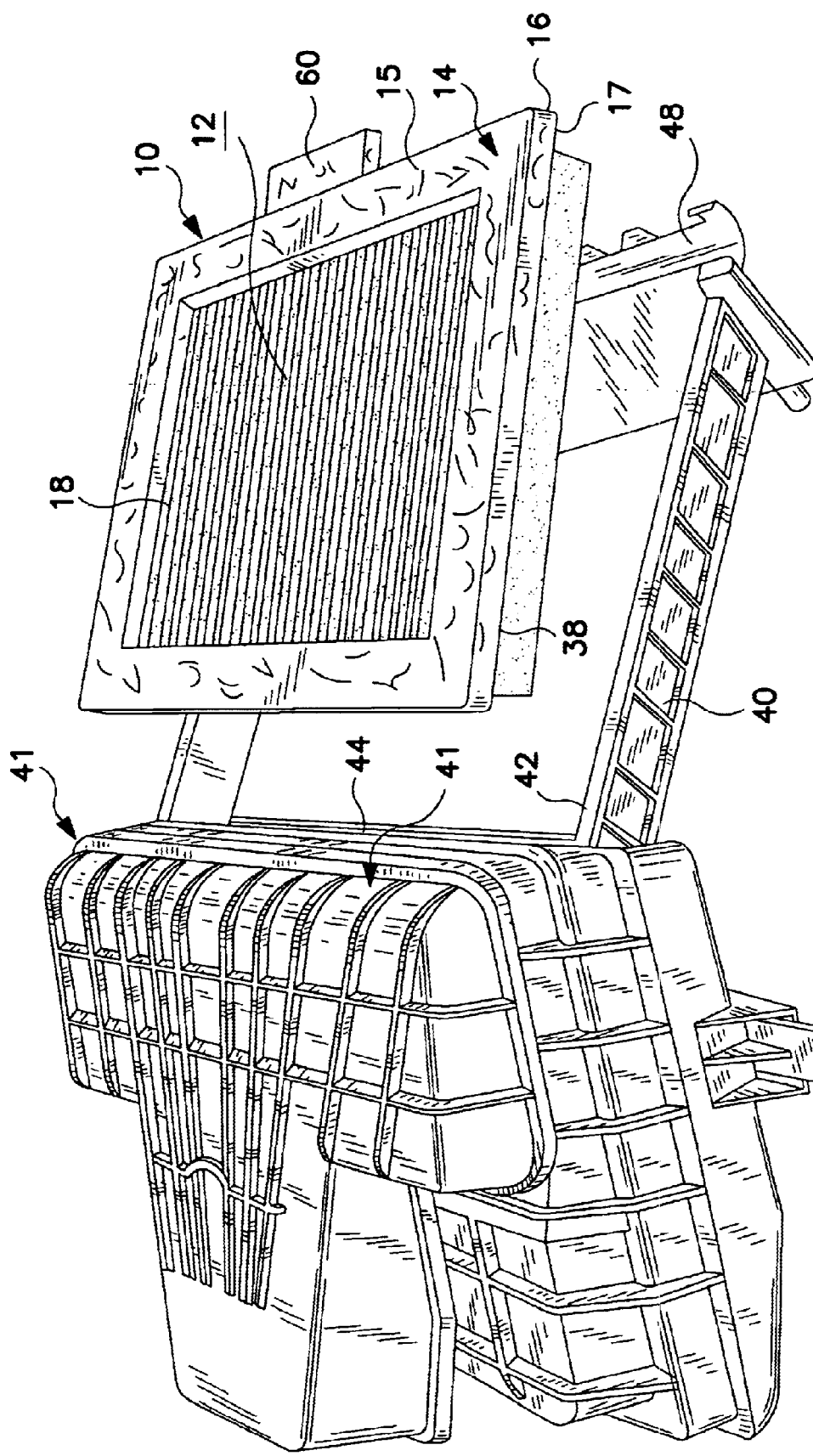
FIG. 5 is a perspective view showing the panel air filter element of FIG. 1 being mounted in a tray prior to insertion into an air filter housing.

Referring now to FIG. 5, the panel air filter element 10 is shown being mounted on a tray 40 of an air filter housing 41 with the clean side face 18 facing up to provide the downstream or clean side of the panel air filter element. The tray 40 has a rim 42 on which the first sealing surface 38 of panel filter element 10 rests.

Figure 6:
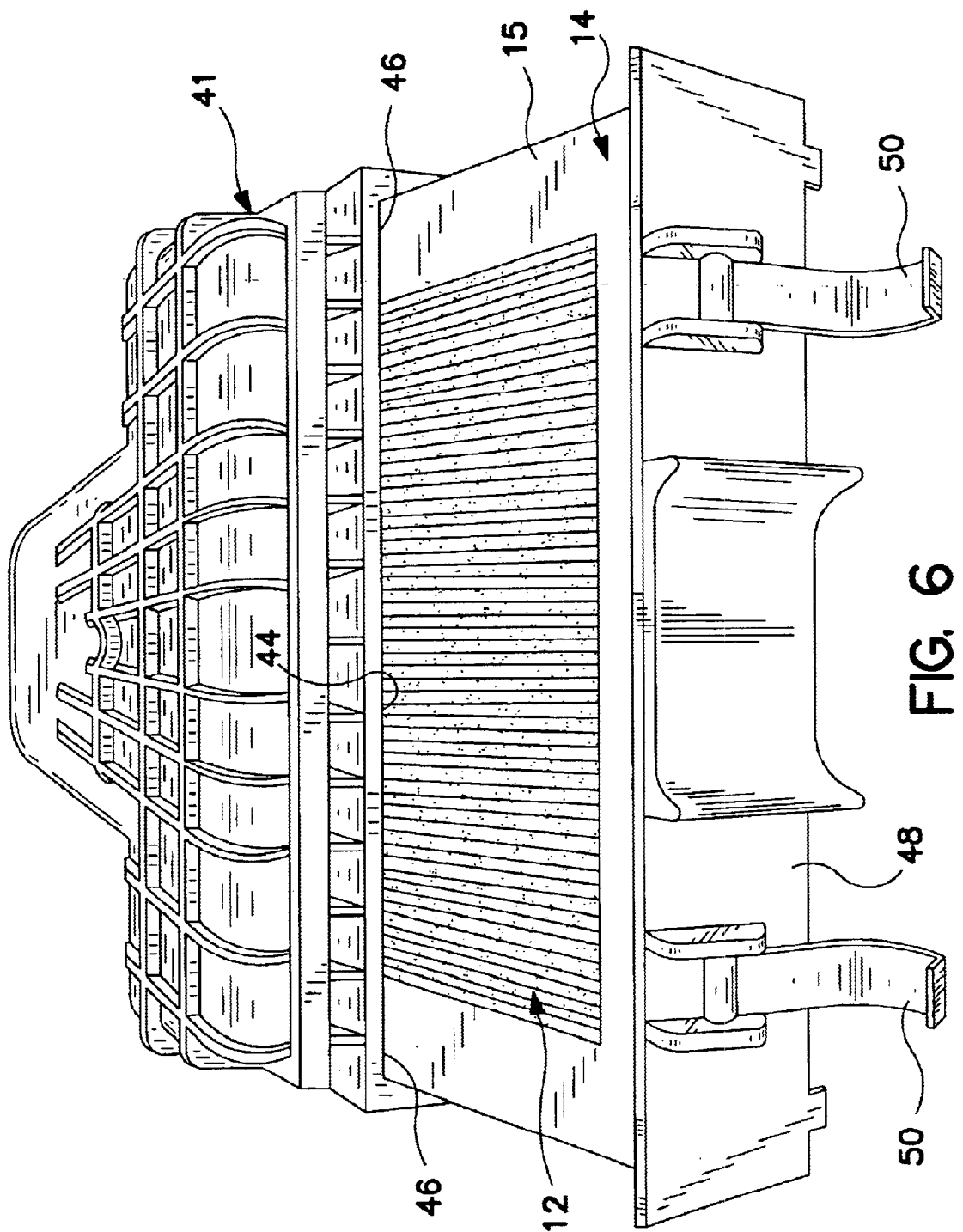
FIGS. 6 and 7 are perspective views showing the tray being slid into the air filter housing with the panel air filter mounted on the tray.
Figure 7:
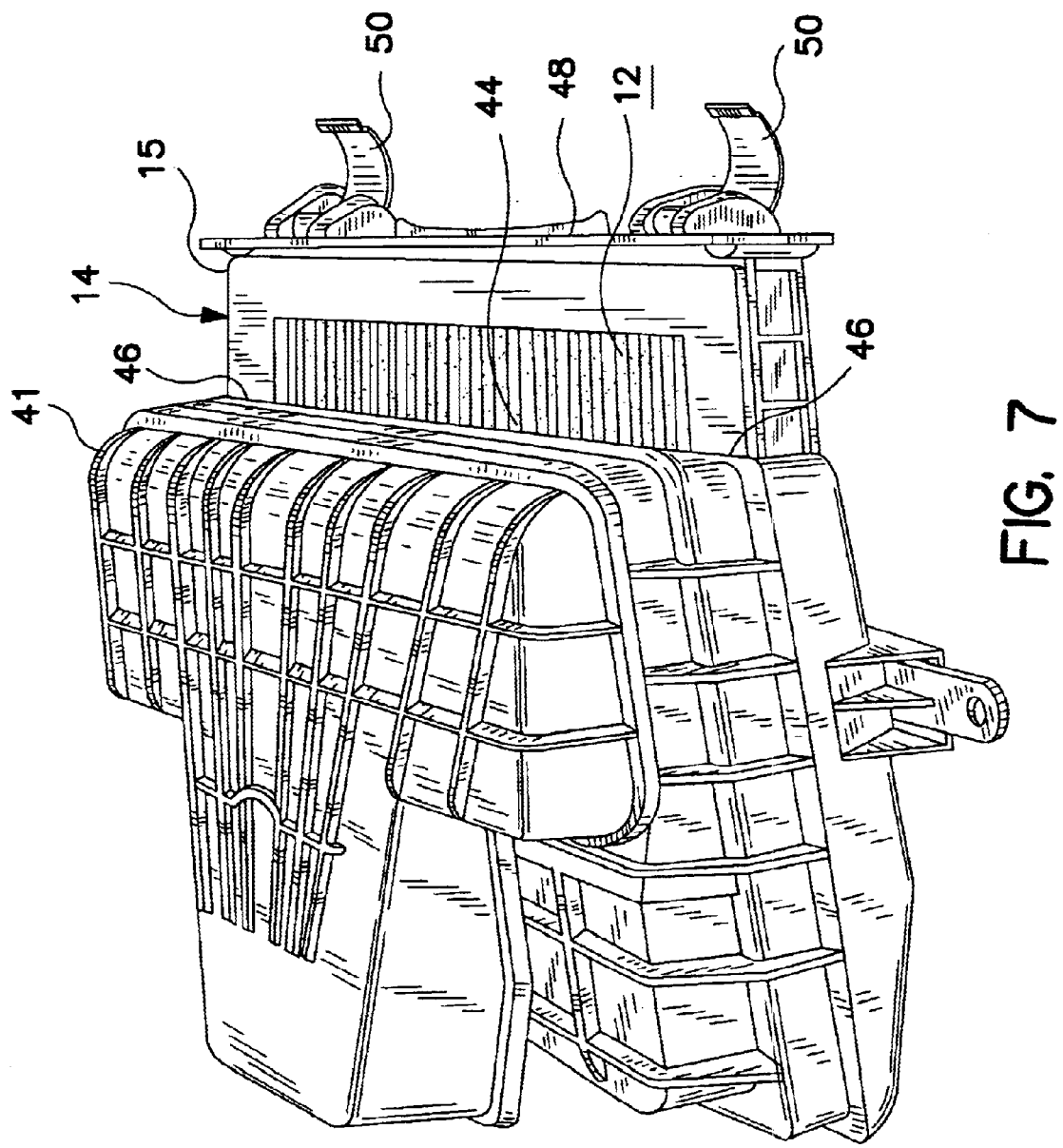

As is seen in FIGS. 6 and 7, the tray 40 is slid into the air filter housing 41 through a slot 44 in the housing with the polyester felt seal 14 sliding beneath a downwardly facing sealing surface 46 around the periphery of the slot through the housing. After the tray 40 is fully inserted into the slot 44, a panel 48 on the front of tray 40 closes the opening 44 and latches 50 retain the tray within the housing 41.

Figure 8:
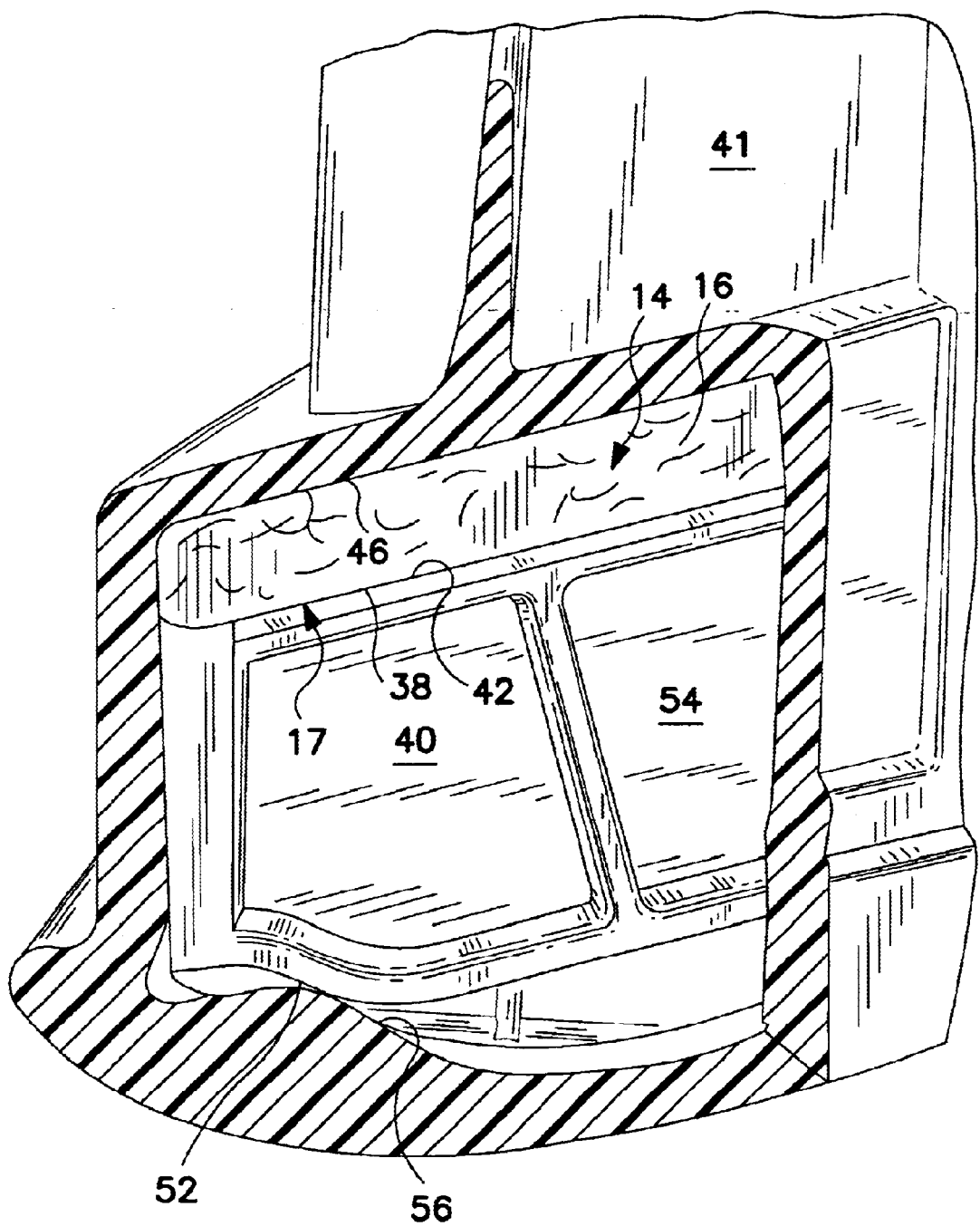
FIG. 8 is a side view of the housing with a portion broken away to show the seal of the panel air filter element positioned within the housing.

Referring now to FIG. 8, which shows a rear portion of the housing 41 with portions of its wall cut away, it is seen that the sealing surface 15 on the seal 14 abuts the downwardly facing sealing surface 46 of the housing 41 while the sealing surface 38 of the filter element bears against the rim 42 of the tray 40. The seal 14 of the filter element 10 is compressed because the bottom surface 52 of the wall 54 which provides the rim 42 of the tray 40 is cammed by surface 56 on the curved bottom 58 of the housing toward the sealing surface 46 of the housing.

In a preferred embodiment a locator tab 60 (FIG. 5) projects laterally from one side of the seal 14 to prevent the filter element 10 from being reinserted into the housing 41 in the wrong orientation after being inspected for clogging during service. The filter element 10 becomes adjusted to one orientation as it is used and does not necessarily seat properly in the housing if reversed upon reinsertion. The tray 40 is modified slightly to provide an area at the panel 48 to accommodate the locator tab 60.

EXAMPLE

A polyester seal 14 having the following characteristics is used with the filter element 10.

| CHARACTERISTIC | VALUE | TEST PROCEDURE |
|---|---|---|
| 1. Thickness | 10.5 ± 1 mm (0.413" ± 0.039") | ASTM D461-93 Sec. 10 |
| 2. Weight | 2034 ± 339 g/m³ (60 ± 10 oz/yd² (Denier-6) | ASTM D461-93 Sec. 11 |
| 3. Splitting Resistance | 44.5 N/50 mm min. (10 lb/2 in) | ASTM D461-93 Sec. 14 |
| 4. Dry heat aging (70 hrs. @ 130° C.) | | |
| Splitting resistance change | −40% max | ASTM D461-93 |
| Dimensional change | +2% −6% | |
| 5. Humidity aging (7 days, 60° C., 100% RH) | | |
| Splitting resistance change | −40% max | ASTM D461-93 |
| Dimensional change | ±4% max | |
| 6. Color | Gray (Reference) | |
| 7. Material | 100% Polyester | |
| 8. Material must not stick to Nylon 6/6 after 100 hours at 130° C., compressed 30% between coupons of the nylon | | TBD |
| 9. Compression Set, ($C_d$, 22 hrs. @ 130° C., 30% Compression | 100% $C_d$ max | ASTM D3574 |
| 10. Length of Fibers | 7.6 ± 2 cm (3" ± 0.7") | |
| 11. Denier | 6 | |

By using a seal of polyester felt, there is no bonding between the NYLON® housing surfaces 46 and the seal. Consequently, the housing 41 need not be destroyed to remove the panel filter element 10 from the housing, as is the case when the seal 12 is made of polyurethane and the polyurethane bonds with the polyamide (NYLON®) of the housing.

From the foregoing description, one skilled in the art can easily ascertain the essential characteristics of this invention, and without departing form the spirit and scope thereof, can make various changes and modifications of the invention to adapt it to various usages and conditions.

I claim:

1. An air filter for mounting in a tray slidable into an air filter housing for delivering combustion air to an internal combustion engine, wherein the air filter housing and tray are made of plastic material, comprising:

a panel of pleated filter media having a first face and a second face, the first face having a filtering area and a peripheral support area, and a peripheral seal made of a felt material not directly bondable with the plastic material of the housing, the peripheral seal being disposed on the peripheral support area of the first face of the pleated filter media.

2. An air filter according to claim 1 wherein the felt material is made of polyester fiber.

3. An air filter according to claim 2 wherein the felt material is about ½ inch thick.

4. An air filter according to claim 3 wherein the plastic material of the housing is a thermoplastic polyamide.

5. An air filter according to claim 4 wherein the peripheral seal and support area of the first face are mutually embedded in a deposit of hot melt polyamide adhesive which bonds the pleated filer media to the peripheral seal.

6. An air filter according to claim 5 wherein the pleated filter media is made of paper.

7. An air filter according to claim 1 wherein the material of the air filter housing and the felt material are not bondable when repeatedly heated and cooled wherein the air filter is removable from the housing without the felt material of the seal adhering to the housing and interfering with replacement of the air filter.

8. An air filter according to claim 7 wherein the housing is made of thermoplastic polyamide and wherein the felt material is polyester felt.

9. An air filter according to claim 8 wherein the pleated filter media is made of paper and is adhered to the polyester felt of the peripheral seal by a layer of polyamide adhesive.

10. An air filter according to claim 8 wherein the felt material is about ½ inch thick and wherein the polyester fibers comprising the felt have a length in the range of 5 to 8 cm and a weight of about 6 denier.

11. The air filter according to claim 10 wherein the polyester fibers have a length of about 7.6 cm.

12. An air filter for an IC engine, the air filter being configured for mounting in a filter housing of plastic material connected to the IC engine, the air filter comprising:
  a panel of pleated filter media having first and second faces, the first face having a filtering area and a peripheral area,
  a peripheral seal made of a material not directly bondable with the housing and being disposed adjacent to the first face, the peripheral sealing material having a sealing face, at least a portion of which is substantially parallel to the first face of the filter media.

13. An air filter according to claim 12 wherein the material not directly boundable with the housing is felt material is made of polyester fiber.

14. An air filter according to claim 13 wherein the plastic material of the housing is a thermoplastic polyamide.

15. An air filter according to claim 12 wherein the plastic material of the housing is a thermoplastic polyamide.

16. An air filter according to claim 12 wherein the peripheral seal and support area of the first face are mutually embedded in a deposit of hot melt polyamide adhesive which bonds the pleated filer media to the peripheral seal.

17. An air filter according to claim 14 wherein the peripheral seal and support area of the first face are mutually embedded in a deposit of hot melt polyamide adhesive which bonds the pleated filer media to the peripheral seal.

18. An air filter according to claim 12, wherein the material of the air filter housing and the felt material are not bondable when repeatedly heated and cooled and wherein the air filter is removable from the housing without the felt material of the seal adhering to the housing and interfering with replacement of the air filter.

19. An air filter according to claim 17 wherein the housing is made of thermoplastic polyamide and wherein the felt material is polyester felt.

20. An air filter according to claim 19 wherein the pleated filter media is made of paper and is adhered to the polyester felt of the peripheral seal by a layer of polyamide adhesive.

21. An air filter according to claim 12, wherein the peripheral seal is disposed directly on the peripheral area of the first face of the filter media.

\* \* \* \* \*